(12) United States Patent
Subramanian

(10) Patent No.: US 9,258,273 B2
(45) Date of Patent: Feb. 9, 2016

(54) DUPLICATING PACKETS EFFICIENTLY WITHIN A NETWORK SECURITY APPLIANCE

(71) Applicant: Sakthikumar Subramanian, San Jose, CA (US)

(72) Inventor: Sakthikumar Subramanian, San Jose, CA (US)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 14/125,393

(22) PCT Filed: Oct. 3, 2013

(86) PCT No.: PCT/US2013/063315
§ 371 (c)(1),
(2) Date: Dec. 11, 2013

(87) PCT Pub. No.: WO2015/050552
PCT Pub. Date: Apr. 9, 2015

(65) Prior Publication Data
US 2015/0101035 A1   Apr. 9, 2015

(51) Int. Cl.
*H04L 29/06* (2006.01)
(52) U.S. Cl.
CPC ....................... *H04L 63/02* (2013.01)
(58) Field of Classification Search
CPC ....................................... H04L 63/02
USPC ............................................. 726/11
See application file for complete search history.

(56) References Cited

U.S. PATENT DOCUMENTS

| | | | | |
|---|---|---|---|---|
| 6,985,956 | B2 * | 1/2006 | Luke et al. | 709/229 |
| 7,187,687 | B1 * | 3/2007 | Davis et al. | 370/419 |
| 7,266,117 | B1 * | 9/2007 | Davis | 370/363 |
| 7,313,614 | B2 * | 12/2007 | Considine et al. | 709/223 |
| 7,363,353 | B2 * | 4/2008 | Ganesan et al. | H04L 29/06 370/235 |
| 7,562,389 | B1 * | 7/2009 | Goyal et al. | 726/22 |
| 7,729,296 | B1 * | 6/2010 | Choudhary | 370/256 |
| 8,059,658 | B1 * | 11/2011 | Rovner et al. | 370/395.31 |
| 8,923,297 | B1 * | 12/2014 | Daniel et al. | 370/392 |
| 2003/0123448 | A1 * | 7/2003 | Chang | G06F 9/54 370/395.1 |

(Continued)

FOREIGN PATENT DOCUMENTS

EP      2 355 423 A1    8/2011

OTHER PUBLICATIONS

Algorithms to Accelerate Multiple Regular Expressions Matching for Deep Packet Inspection|http://www1.cs.columbia.edu/~danr/courses/6772/Fall06/papers/deep.pdf|Kumar et al.|2006|pp. 339-350.*
Bo et al., "Fast Path Session Creation on Network Processors", The 28th International Conference on Distributed Computing Systems, 2008, pp. 573-580.

(Continued)

*Primary Examiner* — Mahfuzur Rahman
(74) *Attorney, Agent, or Firm* — Blank Rome LLP

(57) ABSTRACT

A network security appliance uses a switch to switch packets between cores configured for fast path processing and slow path processing. The switch duplicates packets for delivery to the slow path processing cores, eliminating the need for the fast path processing cores to expend processor resources on packet duplication. The switch can use IEEE 802.1ad Q-in-Q VLAN tags in the packet to perform the switching and packet duplication. Slow path processing cores may also broadcast packets to other slow path processing cores via the switch.

12 Claims, 6 Drawing Sheets

(56) References Cited

U.S. PATENT DOCUMENTS

| | | | |
|---|---|---|---|
| 2006/0023709 A1* | 2/2006 | Hall et al. | 370/389 |
| 2009/0161569 A1* | 6/2009 | Corlett | H04L 43/08 370/252 |
| 2009/0262741 A1* | 10/2009 | Jungck et al. | 370/392 |
| 2010/0061240 A1* | 3/2010 | Sindhu et al. | 370/235 |
| 2011/0066753 A1* | 3/2011 | Wang et al. | 709/238 |
| 2011/0268119 A1* | 11/2011 | Pong et al. | 370/392 |
| 2012/0014386 A1* | 1/2012 | Xiong et al. | 370/392 |
| 2013/0155861 A1 | 6/2013 | Bryers et al. | |
| 2013/0208721 A1* | 8/2013 | Armstrong et al. | 370/392 |
| 2013/0208726 A1* | 8/2013 | Armstrong et al. | 370/401 |
| 2013/0322265 A1* | 12/2013 | Kozisek et al. | 370/251 |
| 2014/0003442 A1* | 1/2014 | Hernandez et al. | 370/401 |
| 2014/0281379 A1* | 9/2014 | Hutton et al. | 712/29 |
| 2014/0282560 A1* | 9/2014 | Hutton et al. | 718/102 |
| 2015/0009995 A1* | 1/2015 | Gross, IV et al. | H04L 45/74 370/392 |

OTHER PUBLICATIONS

Fabio et al., "Scalable Electronic Packet Switches", IEEE Journal on Selected Areas in Communications, vol. 21, No. 4, May 2003, pp. 486-500.

Mcafee, "McAfee Network Security Platform", Data Sheet, A Uniquely Intelligent Approach to Network Security, NS Series, McAfee An Intel Company, 2013, 3 pages.

Mcafee, "McAfee Network Security Platform", Data Sheet, A Uniquely Intelligent Approach to Network Security, M Series, McAfee An Intel Company, 2013, 3 pages.

International Search Report and Written Opinion received for PCT Patent Application No. PCT/US2013/063315, mailed on Jun. 25, 2014, 10 pages.

Roberto et al., "Concurrent fault detection for a multiple-plane packet switch", IEEE/ACM Transactions on Networking, vol. 11, No. 4, Aug. 2003, pp. 616-627.

* cited by examiner

DUPLICATING PACKETS EFFICIENTLY WITHIN A NETWORK SECURITY APPLIANCE

TECHNICAL FIELD

Embodiments described herein generally relate to the field of network security, and in particular to a technique for improving the ability of a network security appliance to perform concurrent processing with high throughput.

BACKGROUND ART

Network security devices protect networks from unwanted network traffic. These devices originally were single processor devices, but have taken advantage of multi-processor and multi-core processor technologies to allow concurrent processing of incoming packets. However, bottlenecks in such network security devices have arisen, including the high processor cost of making duplicate copies of an incoming packet for handling by the multiple processors or multiple cores. Making a copy of a packet is a computationally expensive operation and the simple solution of having a processor make the packet copies and forward the copies to the several processors or cores becomes computationally infeasible at high throughput rates. Thus network security devices have been unable to achieve desired throughput and concurrent processing levels.

DESCRIPTION OF EMBODIMENTS

Figure 1:
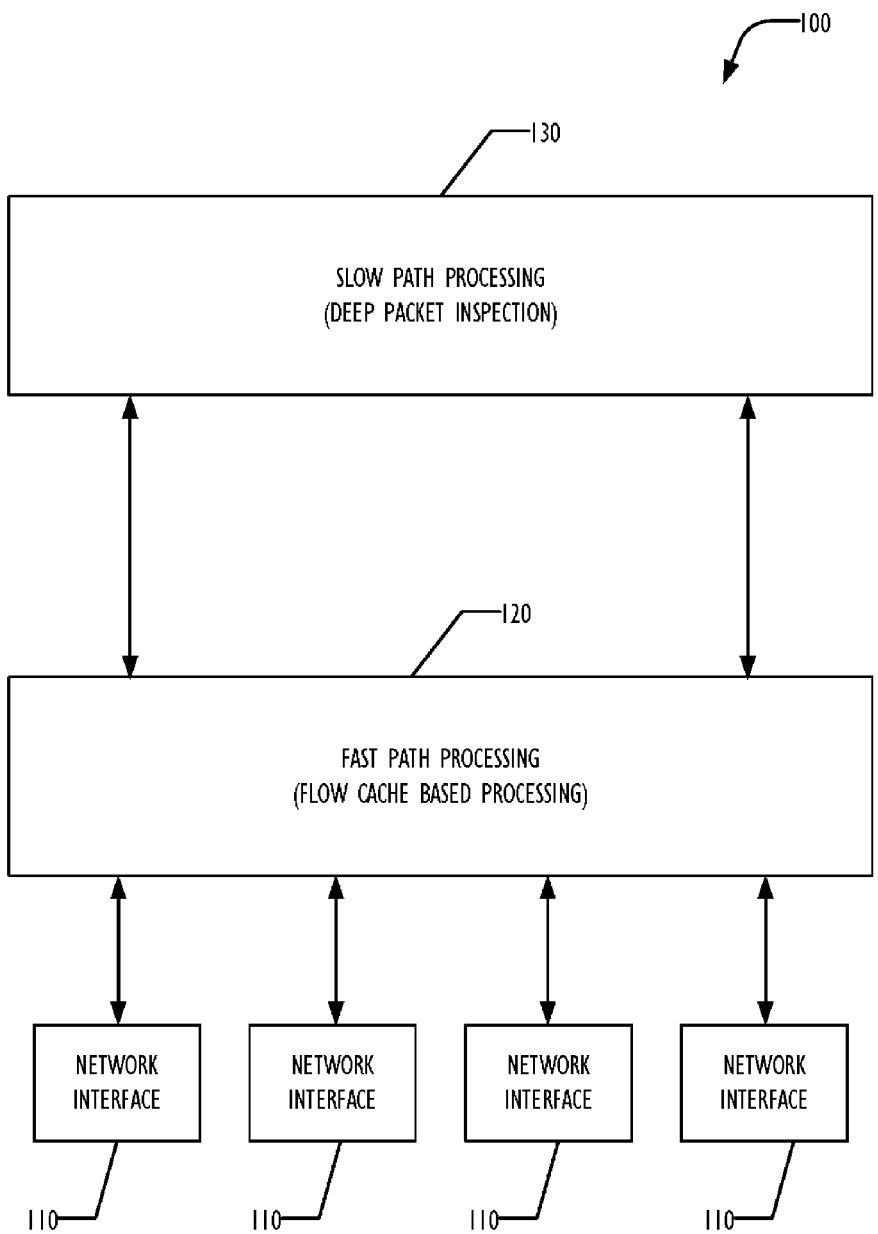
FIG. 1 is a block diagram illustrating a portion of a single processor network security appliance according to the prior art.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a computer system" can refer to a single computer or a plurality of computers working together to perform the function described as being performed on or by a computer system. Although described herein in terms of multi-core processors, in which multiple processor functionality is available on a single integrated circuit die or on multiple dies in a single chip package, the techniques and systems described here can be implemented in multiprocessor systems in which each of the multiple processors is implemented separately on different processor packages. For purposes of this disclosure, a core is defined as a processor implemented either as one of a multi-core processor unit or as a separate processor unit, whether real or virtual.

Although generally described herein as implemented in a physical network security appliance, the described techniques may be implemented in a virtualized network security appliance, in which the multiprocessor technology may be a multiprocessor virtual machine or a plurality of virtual machines performing the network security functionality. Similarly, the switch functionality may be provided by a physical hardware switch device or may be performed in a virtualized switch.

In the figures, an eight-core processor is used as an example, but the number of cores (or processors) is illustrative and by way of example only, and the network security functionality may be implemented in systems with any desired number of cores.

As used herein, the term "a network appliance" can refer to a single network security appliance or a plurality of network security appliances working together to perform the function described as being performed on or by the network security appliance. Any desired processor or core technology may be used One of skill in the art will recognize that a network security appliance can be implemented in a computer system and that other elements of a computer system, such as memory, input devices such as keyboards and mice, and output devices such as displays, and other common components such as links between components may be included as necessary or desired. The memory may include both volatile and non-volatile memory devices, include storage devices of all types, allowing storage of instructions that when executed cause the network security appliance to perform the actions of the various techniques described herein. Because these common devices are well known to the art, they are omitted from the Figures for clarity, and need no further description. The network security appliance may be implemented as a standalone device, or may be implemented by being embedded in another device. Although not described herein, user or administrator interfaces may be provided for the network security appliance to allow configuration of the network security appliance.

In addition, although generally described herein as implemented in a physical network security appliance, the described techniques may be implemented in a virtualized network security appliance, in which the multiprocessor technology may be a multiprocessor virtual machine or a plurality of virtual machines performing the network security functionality. Similarly, the switch functionality may be provided by a physical hardware switch device or may be performed in a virtualized switch.

As used herein, the terms packet and frames should be considered interchangeable.

In the figures, an eight-core processor and four network interfaces are used as an example, but the number of cores and the number of network interfaces are illustrative and by way of example only, and the network security functionality may be implemented in systems with any desired number of cores and network interfaces.

As illustrated in FIG. 1, the packet processing functions of a multi-gigabit network security appliance 100 according to the prior art may be divided into two parts: fast path and slow path. When a packet is received from network interfaces 110, fast path operations 120 such as flow table lookup are performed by the network security appliance 100 to determine if more detailed inspection of the packet (slow path processing 130) is needed. The packet is then forwarded out with or without slow path processing. In a network security appliance 100 as illustrated in FIG. 1, a single core may provide both the fast path and slow path processing, or a first core may be used to perform the fast path processing 120, and a second core used to perform the slow path processing 130. To achieve high throughput in a security appliance 100 such as illustrated in FIG. 1, very fast cores must be used, raising the cost of the network security appliance 100. And even with the fastest cores, the single flow path limits the possible throughput through the network security appliance 100. Fast path processes are generally ones that only look at the non-payload portion of the packet, while slow path processes are generally ones that perform deep packet inspection by looking at the payload of the packet, in addition to or instead of looking at the packet headers. However, as used herein, any packet-analysis process can be a fast path or a slow path process as desired, although generally fast path processes are computationally less resource intensive (and thus faster) than slow path processes.

Figure 2:
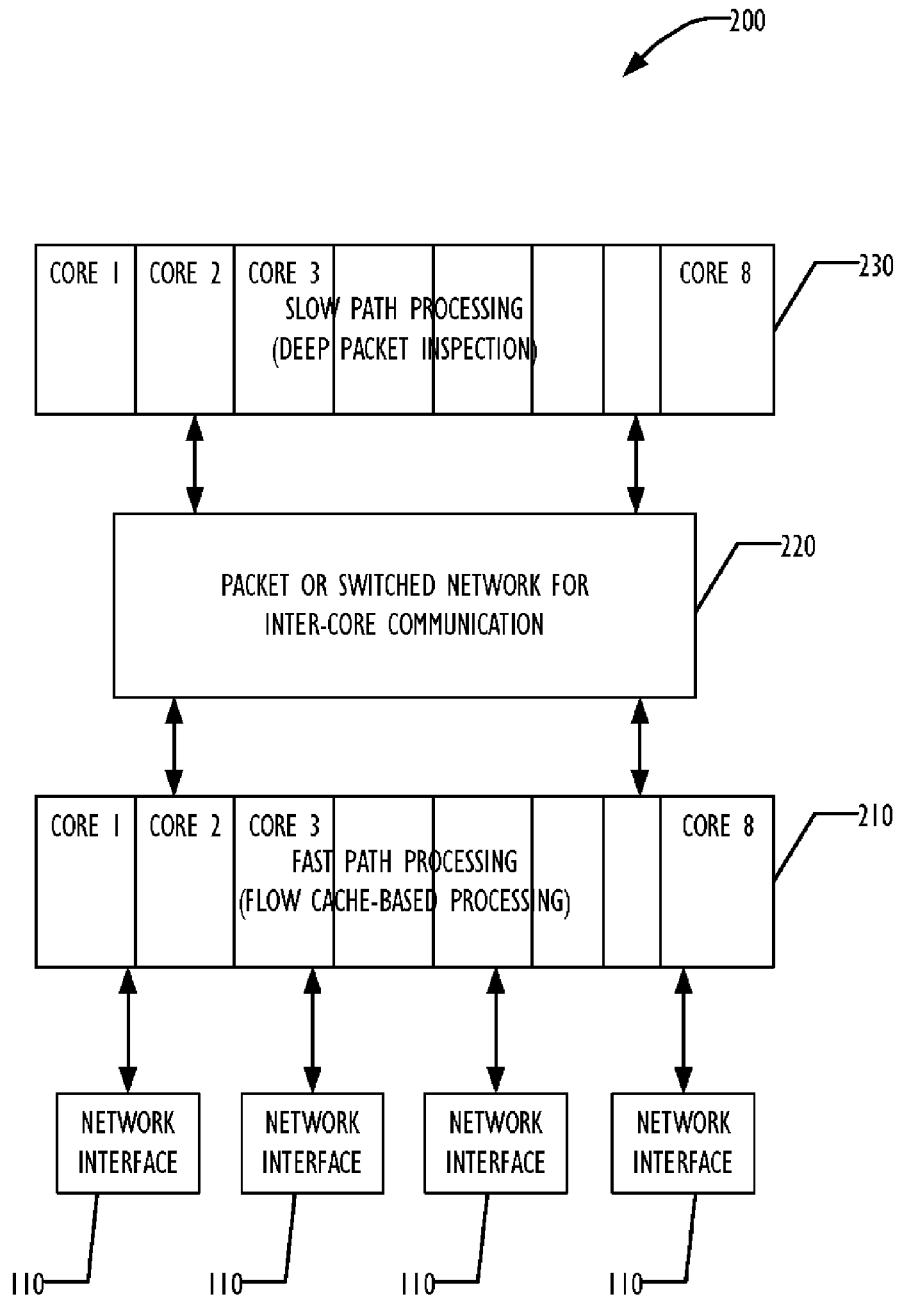
FIG. 2 is a block diagram illustrating a portion of a multi-core network security appliance according to the prior art.

With multi-core processors fast path and slow path processing may be implemented on multiple cores as shown in the network security appliance 200 of prior art FIG. 2. In this example, network interfaces 110 communication with a multi-core processor 210 that handles fast path processing, using flow cache-based processing, then can hand off slow path processing to multi-core processor 230. Although as illustrated in FIG. 2, the fast path processing and the slow path processing are performed in separate multi-core processors 210 and 230, implementations may use some cores of a multi-core processor for fast path processing and other cores of the same multi-core processor for slow path processing such as deep packet inspection. As illustrated in FIG. 2, all the cores 210 and 230 form an L2 or L3 network using network 220 so that packet exchange could take place between the processor cores. However, while this implementation can gain some throughput improvements over the network security appliance of FIG. 1, because the slow path processing in multi-core processor 230 can run currently on different cores, the overhead of duplicating the incoming packets received from the network interfaces 110 requires significant processing power in the fast path processing cores, slowing overall throughput and requiring fast, expensive processors to achieve the desired throughput levels in a multi-gigabit network security alliance.

The inefficiency of the implementation of FIG. 2 is increased when one of the slow path processor cores needs to do some amount of processing on a packet, then send the packet to other slow path processor cores to do additional processing. Once again, copies of the packet need to be made, one for each slow path core receiving from the original slow path core.

How can the fast path cores avoid making copies of a packet if multiple slow path functions such as packet capture and intrusion prevention are implemented on distinct processor cores? How can we avoid packet copy while taking advantage of parallel processing? How can a slow path core avoid packet copies if it needs to broadcast or multicast a packet to a group of other slow path cores, allowing the other slow path cores to operate concurrently on a packet to minimize network latency? The following describes various embodiments that provide solutions to these and other problems.

Figure 3:
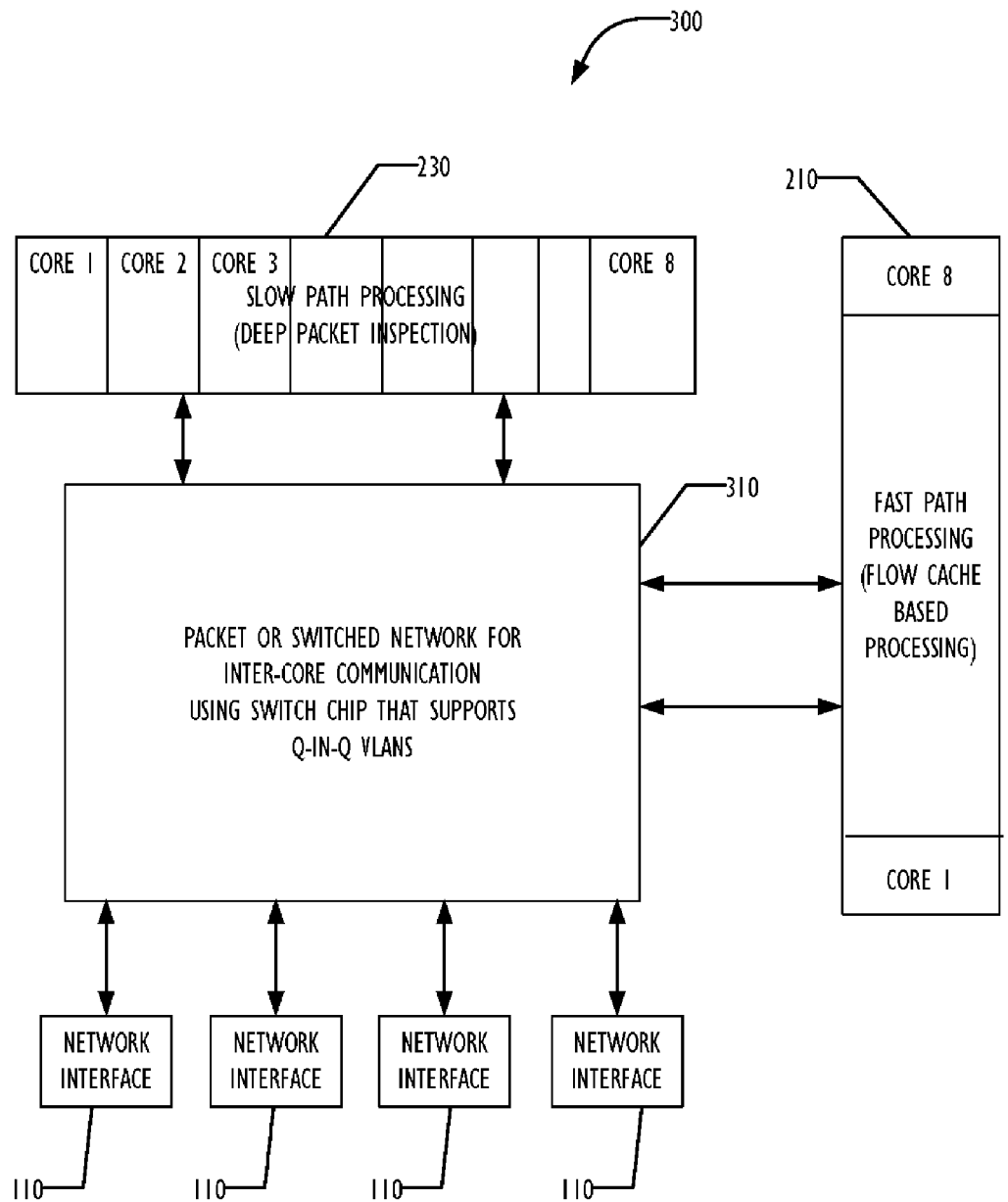
FIG. 3 is a block diagram illustrating a portion of a multi-core network security appliance according to the one embodiment.

FIG. 3 illustrates an embodiment of a network security appliance according to one embodiment. In this embodiment, the fast path processing cores 210, slow path processing cores 230, and network interfaces 110 remain the same as in FIG. 2, but instead of connecting the network interfaces 110 to fast path cores 210, and using an L2 or L3 network 220 to connect fast path cores 210 to slow path cores 230, a switch 310 provides those connections. Alternately, the network interfaces 110 may connect to the fast path cores without passing through switch 310, while the fast path cores 210 and slow path cores 230 are connected via the switch 310. Although network security appliances exist that employ such a switched path between cores, those appliances do not provide the functionality described below. Examples of network security appliances that employ a switched path between cores without the functionality described below include the M and NS series of Network Security Platforms from McAfee, Inc.

One of skill in the art will recognize that the network security appliance 300 can be implemented in a computer system and that other elements of a computer system, such as memory, input devices such as keyboards and mice, and output devices such as displays, and other common components such as links between components may be included as necessary or desired. These common components may be connected to any or all of the components illustrated in FIG. 3 as desired. The memory may include both volatile and non-volatile memory devices, including storage devices of all types, allowing storage of data and instructions that when executed cause the network security appliance 300 to perform the actions of the various techniques described herein. The network security appliance may be implemented as a standalone device, including a mobile device, or may be implemented by being embedded in another device. Although not described herein, user or administrator interfaces may be provided for the network security appliance to allow configuration of the network security appliance. An example of a network security appliance implementation is described below in the discussion of FIG. 6.

As illustrated in FIG. 3, switch 310 connects between network interfaces 110, fast path processing cores 210, and slow path cores 220. In one embodiment, the switch is configured to support Q-in-Q virtual local area networks (VLANs) using the IEEE 802.1ad networking standard (sometimes referred to as 802.1QinQ). Other embodiments may support any other networking protocol that allows the switch to send packets to the desired slow path cores where the switch 310 duplicates the packets, instead of the fast path cores 210 or slow path cores 230.

In the embodiment illustrated in FIG. 3, fast path processing done in cores 210 may determine which slow path processes should be performed on a packet. Slow path cores 230 may be preconfigured to allocate specific slow path cores 230 to a predetermined slow path process. Alternately, slow path cores may be dynamically allocated to slow path processes depending on the network traffic received by the network security appliance 300. Multiple slow path cores may be allocated for the same slow path processes, with more cores allocated for slow path processes that are more commonly employed and fewer cores allocated for slow path processes that are relatively less frequently employed. For example, more cores of the slow path cores 230 may be allocated for Internet Protocol (IP) processing, and fewer cores allocated for data loss prevention (DLP) processing.

Each of the slow path cores 230 is assigned a network address, as is each of the fast path cores 210. The switch 310 may be configured to route incoming packets from network interfaces to one of the fast path cores 210. The switch 310 may then be configured to route packets from the fast path cores 210 to the desired slow path core 230. Because multiple slow path processes may be performed concurrently, the switch 310 may send the same packet from a fast path core 210 to multiple slow path cores 230, duplicating the packet without requiring packet duplication to be performed by the fast path core 210.

The switch 310 in a Q-in-Q VLAN implementation allows defining an outer VLAN for each component (network interface 110, slow path core 230, and fast path core 210) connected to it. The outer VLANs are used for internal switching purposes only. The same outer VLAN may be assigned to multiple components connected to it. For example, the same outer VLAN may be assigned to all of the slow path cores that are to process a packet concurrently. The outer VLANs are inserted when packets are received by the switch from a network interface and stripped when packets egress the switch via the network interface. Each packet arriving via a network interface 110 may already have an inner VLAN tag in the frame. Each VLAN tag comprises a VLAN identifier and a type data. The switch 310 appends a unique outer VLAN to each packet arriving via a network interface 110.

The switch 310 is programmed to switch packets among the various components connected to it using the outer VLAN present in a packet. The switch 310 can thus switch the packet received from a network interface based on the outer VLAN identifier, sending the packet to a fast path core 210 configured as associated with the VLAN identifier. The fast path cores 210 after processing the packet may then change the Q-in-Q VLAN tag in the packet to the VLAN identifier defined for the desired set of slow path cores, then send the packet to the switch 310. The switch 310 then delivers the packet to all of the slow path cores 230 that are configured for that VLAN. The Q-in-Q VLAN tag also comprises a VLAN identifier and a type data, wherein the Q-in-Q VLAN tag's VLAN identifier is used by the switch to switch packets to the slow path cores configured as associated with the Q-in-Q VLAN tag's VLAN identifier.

In addition, some implementations may allow slow path cores 230 to perform the same technique as the fast path cores, generating a packet that can then be broadcast to multiple slow path cores 230 by inserting the Q-in-Q VLAN tag to the packet associated with that group of slow path cores 230.

The IEEE 802.1ad networking standard allows multiple VLAN tags to be inserted in a single frame, and is an extension of the IEEE 802.1Q networking standard that defines VLAN tags in Ethernet frames. The networking standard was developed to allow customers of a service provider to run their own VLANs inside the service provider's provided VLAN. The service provider can then configure a single VLAN for the customer, which the customer can treat as a trunk, with multiple customer VLANs being carried on a single service provider VLAN.

Although IEEE 802.1ad theoretically allows any number of VLAN tags in a frame, implementations of the switched technique described above may use an inner VLAN tag and an outer VLAN tag to perform the packet routing and duplication needed for the network security appliance 300. In one implementation, the frames are defined as broadcast frames, allowing the switch 310 to deliver the frame to the multiple slow path cores associated with the outer VLAN tag, automatically duplicating the frame without the need for a fast path core 210 to perform packet duplication.

The Q-in-Q VLANS are configured via a switch API and/or commands. A VLAN is created by providing the identifier (say 100), specifying which ports of the switch 310 belong to the VLAN, and the subset of those ports that should be considered "external." When a packet is received from an external port, the switch 310 inserts the outer VLAN on receiving the packet. For example, each of the network interfaces 110 may be configured with a unique VLAN and marked external. When a packet is received, the switch 310 is programmed to insert the outer VLAN (which also implies the outer VLAN would be stripped on egress) assigned to the network interface 110.

The ports of the switch 310 connected to the fast path cores 230 also belong to the outer VLANs assigned to the network interfaces 110. The outer VLAN only defines the receivers—the sender need not belong to that VLAN. Thus, the slow path cores 230 may insert an outer VLAN identifying a network interface 110 in order to send the packet out of the system by that network interface 110. The switch 310 may be programmed with rules that provide greater control on how packets are switched. In one embodiment, all packets received on the network interfaces 110 may be load balanced among the fast path cores 210 using such a rule.

The rules can also be used to force a packet to a particular subset of components belonging to a VLAN instead of sending to all of them. For example, a rule may ensure that packets sent by the slow path cores 230 to a network interface 110 are not broadcast to the fast path cores 210 even though the fast path cores 210 belong to all outer VLANs assigned to network interfaces 110, to ensure they will be able to receive packets entering the system from the outer world.

Figure 4:
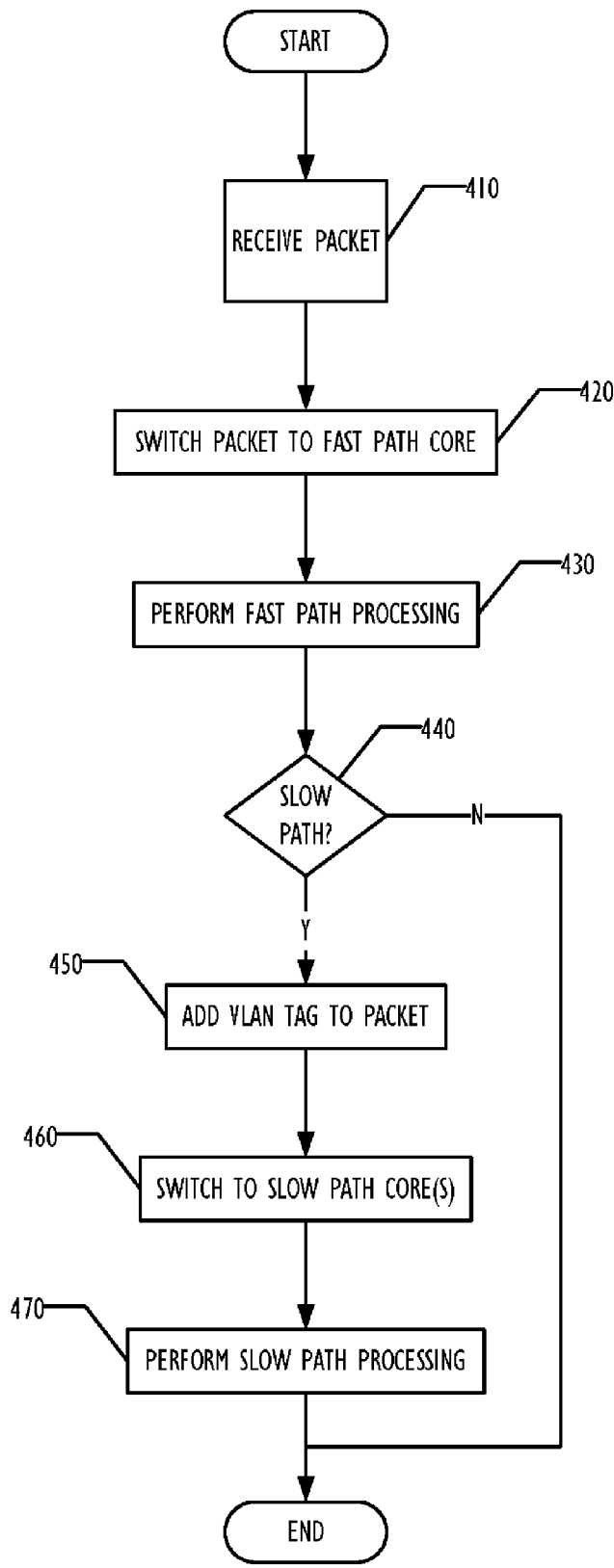
FIG. 4 is a flowchart illustrating a technique for duplicating packets in a network security appliance according to one embodiment.

FIG. 4 is a flowchart illustrating an embodiment of a technique for using a switch to reduce packet processing overhead by duplicating packets efficiently in a network security appliance. In block 410 the network security appliance 300 receives a frame. In block 420, the switch 310 switches the frame to a fast path core 210 to perform fast path processing. Upon completion of the fast path processing in block 430, a determination is made whether any slow path processing is desired for the packet in block 440. If slow path processing is desired, then the fast path core 210 adds a VLAN tag to the packet in block 450, and sends the packet to the switch 310. The VLAN tag is configured to identify a VLAN associated with the cores to be used for the slow path processing. Any or all of the slow path cores 230 may be associated with the VLAN, including cores 230 that perform different slow path processes.

The switch 310 then uses the VLAN tag inserted by the fast path core 210 to switch the packet in block 460 to the slow path core(s) associated with the VLAN identified by the VLAN tag. In one embodiment, a buffer in the switch 310 may be used to hold the packet for sending to multiple slow path cores associated with the VLAN.

In block 470, the slow path core(s) associated with the VLAN then concurrently perform their configured slow path processes on the packet.

The fast path cores 210 or the slow path cores 230 may take any action desired based on their respective fast path or slow path processing, including flushing the packet.

Figure 5:
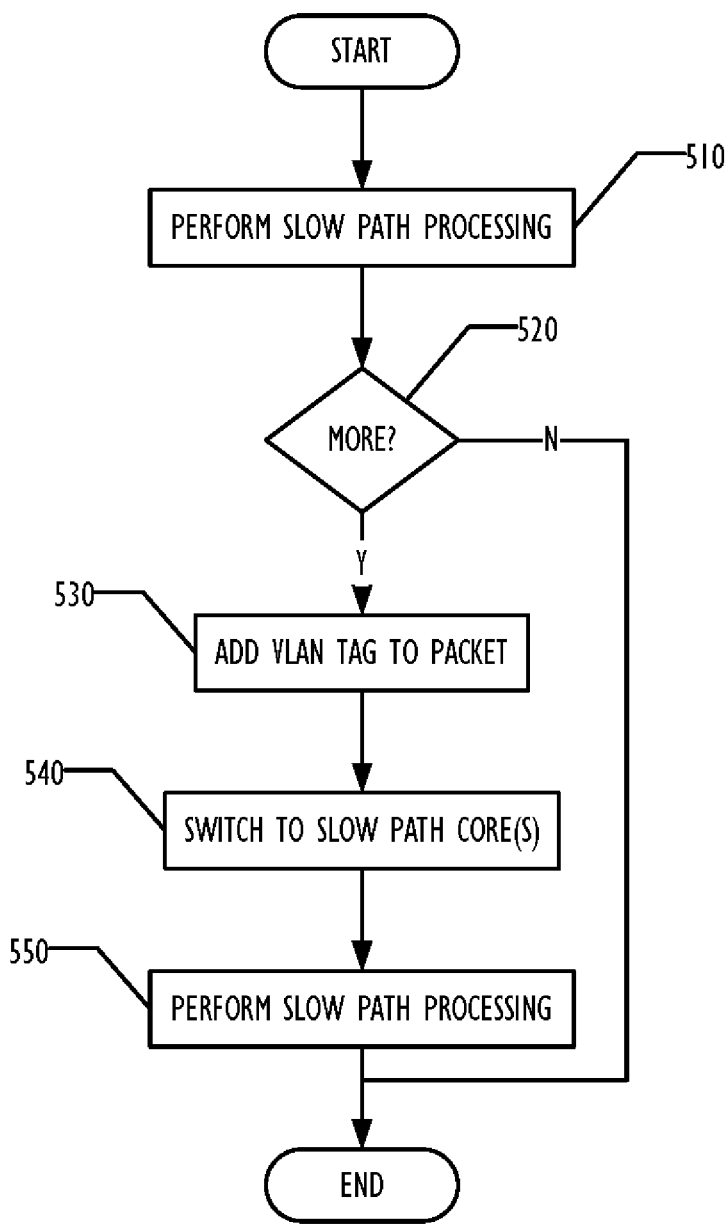
FIG. 5 is a flowchart illustrating a technique for using a switch to route packets in a network security appliance according to one embodiment.

FIG. 5 is a flowchart illustrating an embodiment in which slow path cores 230 may send packets to other slow path cores via the switch 310. In this embodiment, some slow path cores 230 may be configured to perform a first type of slow path process, and other slow path cores 230 may be configured to perform a second type of slow path process that is to be performed after the first type of slow path process. In block 510, a slow path core performs a configured first type slow path process on a packet. A determination is made in block 520 whether second type slow path processing by other slow path cores 230. If additional slow path processing is desired, then the slow path core 230 may add a VLAN tag to the packet, similar to how one was added by the fast path core 210 before switching the packet to the slow path core 230. The new VLAN tag added by slow path core 230 replaces the VLAN tag inserted by the fast path core 210, removing that tag before adding the new VLAN tag. The switch 310 is then provided the packet, and switches the packet to the slow path cores(s) 230 configured to perform the second type slow path processing in block 540. The slow path core(s) 230 receives the switch packet with the VLAN tag added by the slow path core in block 530 and performs in block 550 the second type slow path processing. The designations first type and second type of slow path processing are arbitrary and illustrative, and any type of process can be either a first type of slow path process, a second type of slow path process, or both.

By using the Q-in-Q VLAN capability of the switch 310, the switch 310 can be used to duplicate packets in the network security appliance instead of expending processor resources in a fast path or slow path core, thus allowing higher throughput with the same hardware or the same throughput with less expensive hardware. This technique allows better use of the concurrent processing capabilities of the multi-core processors used in the network security appliance 300.

Although described above in terms of Q-in-Q VLAN capabilities, embodiments using IEEE 802.1Q VLAN capabilities may be implemented that do not support Q-in-Q VLAN capabilities, in situations where the incoming packets would not contain existing VLAN information.

Figure 6:
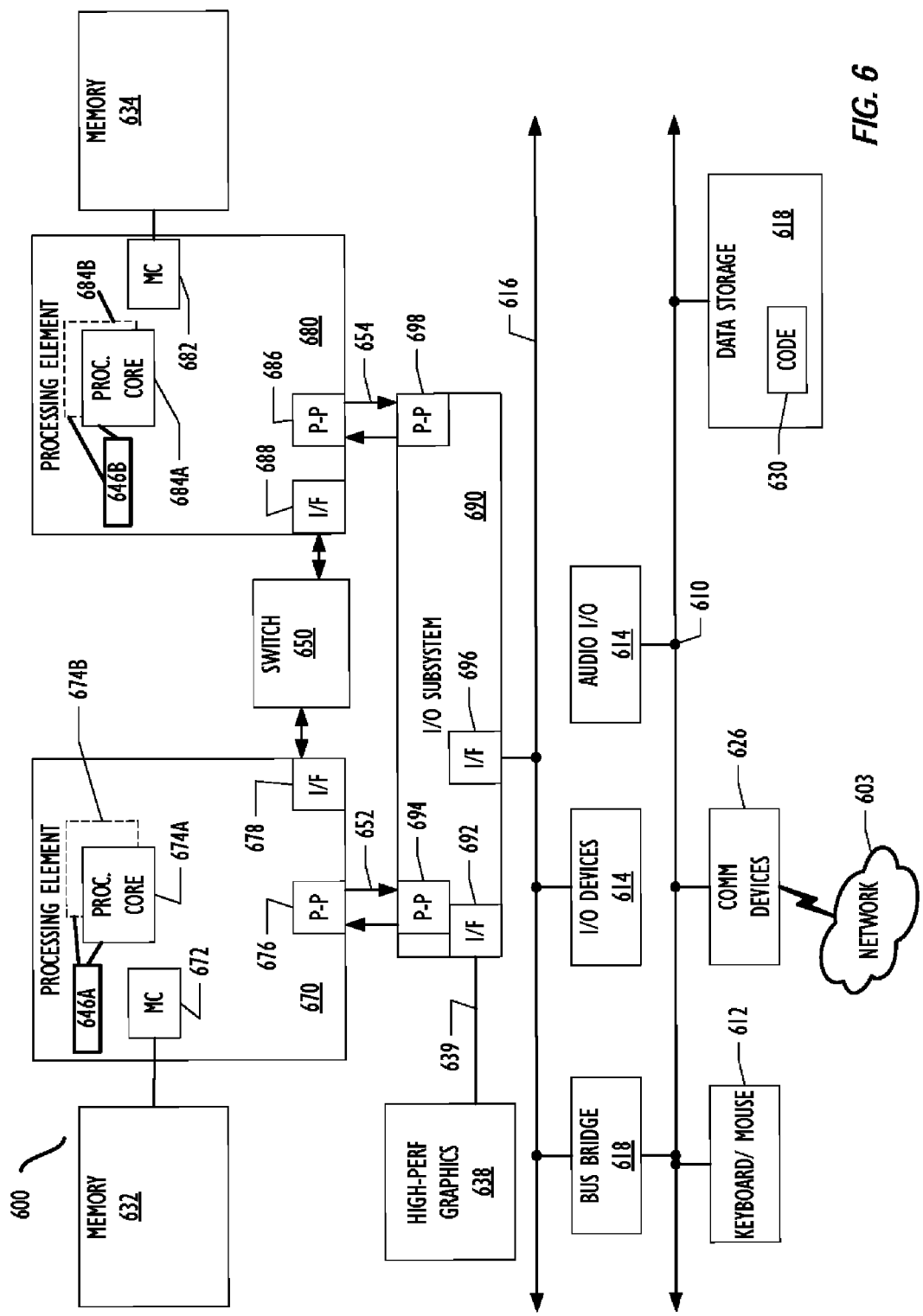
FIG. 6 is a block diagram illustrating a network security appliance according to one embodiment.

Referring now to FIG. 6, shown is a block diagram of a network security appliance embodiment 600 in accordance with an embodiment of the present invention. Shown in FIG. 6 is a multiprocessor network security appliance 600 that includes a first processing element 670 and a second processing element 680.

Network security appliance 600 is illustrated as a switched interconnect system, wherein the first processing element 670 and second processing element 680 are coupled via a switched interconnect 650. It should be understood that any or all of the interconnects illustrated in FIG. 6 other than the switched interconnect 650 may be implemented as a multi-drop bus rather than a point-to-point interconnect. Switched interconnect 650 may include buffers and memory that are not illustrated in FIG. 6 for clarity.

As shown in FIG. 6, each of processing elements 670 and 680 may be multicore processors, including first and second processor cores (i.e., processor cores 674a and 674b and processor cores 684a and 684b). Such cores 674, 674b, 684a, 684b may be configured to execute instruction code in a manner similar to that discussed above in connection with FIG. 3. In one embodiment, fast path cores 210 may be configured from the processor cores of processing elements 670 and slow path cores 230 may be configured from the processor cores of processing elements 680. In alternate embodiments, fast path cores 210 and slow path cores 230 may be configured from the cores of any processing element, so that both fast path cores and slow path cores are deployed in the same processing element.

Each processing element 670, 680 may include at least one shared cache 646. The shared cache 646A, 646B may store data (e.g., instructions) that are utilized by one or more components of the processor, such as the cores 674a, 674b and 684a, 684b, respectively. For example, the shared cache may locally cache data stored in a memory 632, 634 for faster access by components of the processor. In one or more embodiments, the shared cache may include one or more mid-level caches, such as level 2 (L2), level 3 (L3), level 4 (L4), or other levels of cache, a last level cache (LLC), and or combinations thereof.

While shown with only two processing elements 670, 680, it is to be understood that the scope of the present invention is not so limited. In other embodiments, one or more additional processing elements may be present in a given processor. Alternatively, one or more of processing elements 670, 680 may be an element other than a processor, such as an accelerator or a field programmable gate array. For example, additional processing element(s) may include additional processors(s) that are the same as a first processor 670, additional processor(s) that are heterogeneous or asymmetric to processor a first processor 670, accelerators (such as, e.g., graphics accelerators or digital signal processing (DSP) units), field programmable gate arrays, or any other processing element. There can be a variety of differences between the processing elements 670, 680 in terms of a spectrum of metrics of merit including architectural, microarchitectural, thermal, power consumption characteristics, and the like. These differences may effectively manifest themselves as asymmetry and heterogeneity amongst the processing elements 670, 680. For at least one embodiment, the various processing elements 670, 680 may reside in the same die package.

First processing element 670 may further include memory controller logic (MC) 672, point-to-point (P-P) interface 676 and switch interface 678. Similarly, second processing element 680 may include a MC 682, P-P interfaces 686, and switch interface 688. As shown in FIG. 6, MC's 672 and 682 couple the processors to respective memories, namely a memory 632 and a memory 634, which may be portions of main memory locally attached to the respective processors. While MC logic 672 and 682 is illustrated as integrated into the processing elements 670, 680, for alternative embodiments the MC logic may be discrete logic outside the processing elements 670, 680 rather than integrated therein.

First processing element 670 and second processing element 680 may be coupled to an I/O subsystem 690 via P-P interconnects 676, 686 and 684, respectively. As shown in FIG. 6, I/O subsystem 690 includes P-P interfaces 694 and 698. Furthermore, I/O subsystem 690 includes an interface 692 to couple I/O subsystem 690 with a high performance graphics engine 638. In one embodiment, bus 649 may be used to couple graphics engine 638 to I/O subsystem 690. Alternately, a point-to-point interconnect 639 may couple these components.

In turn, I/O subsystem 690 may be coupled to a first bus 616 via an interface 696. In one embodiment, first bus 616 may be a Peripheral Component Interconnect (PCI) bus, or a bus such as a PCI Express bus or another third generation I/O interconnect bus, although the scope of the present invention is not so limited.

As shown in FIG. 6, various I/O devices 614 may be coupled to first bus 616, along with a bus bridge 618 which may couple first bus 616 to a second bus 610. In one embodiment, second bus 620 may be a low pin count (LPC) bus. Various devices may be coupled to second bus 620 including, for example, a keyboard/mouse 612, communication device(s) 626 (which may in turn be in communication with the computer network 603, providing the network interfaces 110), and a data storage unit 618 such as a disk drive or other mass storage device which may include code 630, in one embodiment. The code 630 may include instructions for performing embodiments of one or more of the methods described above. Further, an audio L/O 624 may be coupled to second bus 620. As described above, in an alternate embodiment, the communication devices 626 may be connected to the processing elements 670 and 680 via the switched interconnect 650.

Note that other embodiments are contemplated. For example, instead of the point-to-point architecture of FIG. 6, a network security appliance may implement a multi-drop bus or another such communication topology. Also, the elements of FIG. 6 may alternatively be partitioned using more or fewer integrated chips than shown in FIG. 6.

The following examples pertain to further embodiments.

Example 1 is a network security appliance, including: a network interface; a first core; a first plurality of cores: a switch connected to the first core and the first plurality of cores; a machine readable medium, on which is stored instructions including instructions that when executed by the network security appliance cause the network security appliance to: perform in the first core fast path processing on a packet received by the network security appliance: insert by the first core a first virtual local area network tag into the packet: switch the packet to the first plurality of cores based on the first virtual local area network tag; and perform slow path processing concurrently in the first plurality of cores.

Example 2 includes the subject matter of example 1, wherein the instructions stored on the machine readable medium further comprise instructions that when executed cause the network security appliance to: receive the packet by the network interface; insert a second virtual local area network tag into the packet; and switch the packet to the first core based on the second virtual local area network tag.

Example 3 includes the subject matter of example 2, wherein the instructions stored on the machine readable medium further comprise instructions that when executed cause the network security appliance to: associate the first core with a first virtual local area network identified by the second virtual local area network tag.

Example 4 includes the subject matter of any of examples 2-3, wherein the instructions stored on the machine readable medium further comprise instructions that when executed cause the network security appliance to: configure the switch to switch packets based on the first virtual local area network tag and the second virtual local area network tag.

Example 5 includes the subject matter of example 1, wherein the instructions stored on the machine readable medium further comprise instructions that when executed cause the network security appliance to: remove the first virtual local area network tag from the packet: insert by a second core a second virtual local area network tag into the packet, wherein the second core is a member of the first plurality of cores; and switch the packet to one or more of the first plurality of cores based on the second virtual local area network tag.

Example 6 includes the subject matter of example 1, wherein the instructions stored on the machine readable medium further comprise instructions that when executed cause the network security appliance to: associate the first plurality of cores with a first virtual local area network identified by the first virtual local area network tag.

Example 7 includes the subject matter of any of examples 1-2 and 5-6, wherein the instructions stored on the machine readable medium further comprise instructions that when executed cause the network security appliance to: configure the switch to switch packets based on the first virtual local area network tag.

Example 8 is a network security appliance, including: a first core; a first plurality of cores; a switch connected to the first core and the first plurality of cores; a first memory connected to the first core, on which is stored instructions that when executed by a first core of the first core cause the first core to: perform fast path processing of a packet; and send the packet to the switch addressed to a subplurality of the first plurality of cores; and a second memory connected to the first plurality of cores, on which is stored instructions that when executed by the subplurality of the first plurality of cores cause the subplurality of the first plurality of cores to: perform slow path processing of the packet concurrently, wherein the switch is configured to duplicate the packet received from the first core and send the duplicated packet to each of the subplurality of the first plurality of cores.

Example 9 includes the subject matter of example 8, wherein the switch is configured to switch packets based on a virtual local area network standard.

Example 10 includes the subject matter of example 9, wherein the switch switches the packet from the first core to the subplurality of the first plurality of cores based on a virtual local area network tag inserted in the packet by the first core.

Example 11 includes the subject matter of any of examples 8-9, further including: a network interface, connected to the first core, configured to receive the packet.

Example 12 includes the subject matter of example 11, wherein the network interface is connected to the first core via the switch.

Example 13 includes the subject matter of example 12, wherein the switch is configured to insert a first virtual local area network tag into the packet and switch the packet based on the first virtual local area network tag, and wherein the first core is configured as associated with a first virtual local area network identified by the first virtual local area network tag.

Example 14 includes the subject matter of any of examples 8-9, wherein the instructions stored on the second memory comprise instructions that when executed by a second core of the first plurality of cores cause the second core to: send the packet to the switch addressed to a second subplurality of the first plurality of cores.

Example 15 includes the subject matter of example 14, wherein the instructions stored on the second memory further comprise instructions that when executed by the second core cause the second core to: remove a virtual local area network tag added to the packet by the first core; and insert a virtual local area network tag into the packet.

Example 16 includes the subject matter of any of examples 8-9, wherein the switch comprises a buffer memory for holding the packet while switching the packet to the subplurality of the second plurality of cores.

Example 17 is a method of processing packets in a network security appliance, including: receiving a packet at a network interface; performing fast path processing by a first core of the network security appliance; determining by the first core that slow path processing should be performed by a plurality of cores of the network security appliance; sending the packet from the first core to a switch of the network security appliance; duplicating the packet by the switch, sending each of the duplicated packets to a member of the plurality of cores for slow path processing; and performing slow path processing on the duplicated packet.

Example 18 includes the subject matter of example 17, further including: determining by a second core of the plurality of cores performing slow path processing that additional slow path processing should be performed on the packet; sending the packet from the second core to the switch; duplicating the packet by the switch, sending each of the duplicated packets to a member of the plurality of cores performing slow path processing; and performing the additional slow path processing of the packet.

Example 19 includes the subject matter of example 17, further including: inserting a virtual local area network tag into the packet, wherein duplicating the packet by the switch, sending each of the duplicated packets to a member of the plurality of cores for slow path processing comprises: switching the duplicated packets to the plurality of cores based on the virtual local area network tag.

Example 20 includes the subject matter of example 17, further including: associating the first core with a first virtual local area network; and associating the plurality of cores with a second virtual local area network.

Example 21 is a machine readable medium, on which is stored instructions including instructions that when executed cause a network security appliance to perform the method of any of examples 17-20.

Example 22 is a non-transitory machine readable medium with instructions stored thereon, including instructions that when executed cause a network security appliance to: perform in a first core fast path processing on a packet received by the network security appliance; insert by the first core a first virtual local area network tag into the packet; switch the packet to a first plurality of cores based on the first virtual local area network tag; and perform slow path processing concurrently in the first plurality of cores.

Example 23 includes the subject matter of example 22, wherein the instructions stored thereon further comprise instructions that when executed cause the network security appliance to: receive the packet by a network interface of the network security appliance; insert a second virtual local area network tag into the packet; and switch the packet to the first core based on the second virtual local area network tag.

Example 24 includes the subject matter of example 23, wherein the instructions stored thereon further comprise instructions that when executed cause the network security appliance to: associate the first core with a first virtual local area network identified by the second virtual local area network tag.

Example 25 includes the subject matter of any of examples 23-24, wherein the instructions stored thereon further comprise instructions that when executed cause the network security appliance to: configure a switch of the network appliance to switch packets based on the first virtual local area network tag and the second virtual local area network tag.

Example 26 includes the subject matter of example 22, wherein the instructions stored thereon further comprise instructions that when executed cause the network security appliance to: remove the first virtual local area network tag from the packet; insert by a second core a second virtual local area network tag into the packet, wherein the second core is a member of the first plurality of cores; and switch the packet to a second plurality of cores based on the second virtual local area network tag.

Example 27 includes the subject matter of any of examples 22 and 26, wherein the instructions stored thereon further comprise instructions that when executed cause the network security appliance to: associate the first plurality of cores with a first virtual local area network identified by the first virtual local area network tag.

Example 28 includes the subject matter of any of examples 22 and 26-27, wherein the instructions stored thereon further comprises instructions that when executed cause the network security appliance to: configure a switch of the network appliance to switch packets based on the first virtual local area network tag.

Example 29 is a network security appliance, including: a first core; a network interface, connected to the first core, configured to receive the packet; a first plurality of cores; a switch connected to the first core and the first plurality of cores: a first memory connected to the first core, on which is stored instructions that when executed by a first core of the first core cause the first core to: perform fast path processing of a packet; and send the packet to the switch addressed to a subplurality of the first plurality of cores; and a second memory connected to the first plurality of cores, on which is stored instructions that when executed by the subplurality of the first plurality of cores cause the subplurality of the first plurality of cores to: perform slow path processing of the packet concurrently, wherein the switch is configured to duplicate the packet received from the first core and send the duplicated packet to each of the subplurality of the first plurality of cores, and wherein the switch optionally comprises a buffer memory for holding the packet while switching the packet to the subplurality of the first plurality of cores.

Example 30 includes the subject matter of example 29, wherein the switch switches the packet from the first core to the subplurality of the first plurality of cores based on a virtual local area network tag inserted in the packet by the first core.

Example 31 includes the subject matter of example 29, wherein the network interface is connected to the first core via the switch, wherein the switch is configured to insert a first virtual local area network tag into the packet and switch the packet based on the first virtual local area network tag, and wherein the first core is configured as associated with a first virtual local area network identified by the first virtual local area network tag.

Example 32 includes the subject matter of any of examples 29-31, wherein the instructions stored on the second memory comprise instructions that when executed by a second core of the first plurality of cores cause the second core to: send the packet to the switch addressed to a second subplurality of the first plurality of cores.

Example 33 includes the subject matter of any of examples 29-32, wherein the instructions stored on the second memory further comprise instructions that when executed by the second core cause the second core to: remove a virtual local area network tag added to the packet by the first core; and insert a virtual local area network tag into the packet.

Example 34 is a method of processing packets in a network security appliance, including: receiving a packet at a network interface; performing fast path processing by a first core of the network security appliance; determining by the first core that slow path processing should be performed by a plurality of cores of the network security appliance; sending the packet from the first core to a switch of the network security appliance; duplicating the packet by the switch, sending each of the duplicated packets to a member of the plurality of cores for slow path processing; and performing slow path processing on the duplicated packet.

Example 35 includes the subject matter of example 34, further including: determining by a second core of the plurality of cores performing slow path processing that additional slow path processing should be performed on the packet; sending the packet from the second core to the switch; duplicating the packet by the switch, sending each of the duplicated packets to a member of the plurality of cores performing slow path processing; and performing the additional slow path processing of the packet.

Example 36 includes the subject matter of any of examples 34-35, further including: associating the first core with a first virtual local area network; and associating the plurality of cores with a second virtual local area network. inserting a virtual local area network tag into the packet, wherein duplicating the packet by the switch, sending each of the duplicated packets to a member of the plurality of cores for slow path processing comprises: switching the duplicated packets to the plurality of cores based on the virtual local area network tag.

Example 37 is a non-transitory machine readable medium with instructions stored thereon, including instructions that when executed cause a network security appliance to: perform in a first core fast path processing on a packet received by the network security appliance: insert by the first core a first virtual local area network tag into the packet: switch the packet to a first plurality of cores based on the first virtual local area network tag; and perform slow path processing concurrently in the first plurality of cores.

Example 38 includes the subject matter of example 37, wherein the instructions stored thereon further comprise instructions that when executed cause the network security appliance to: receive the packet by a network interface of the network security appliance; insert a second virtual local area network tag into the packet; and switch the packet to the first core based on the second virtual local area network tag.

Example 39 includes the subject matter of example 38, wherein the instructions stored thereon further comprise instructions that when executed cause the network security appliance to: associate the first core with a first virtual local area network identified by the second virtual local area network tag.

Example 40 includes the subject matter of any of examples 38 and 39, wherein the instructions stored thereon further comprise instructions that when executed cause the network security appliance to: configure a switch of the network appliance to switch packets based on the first virtual local area network tag and the second virtual local area network tag.

Example 41 includes the subject matter of example 37, wherein the instructions stored thereon further comprise instructions that when executed cause the network security appliance to: remove the first virtual local area network tag from the packet; insert by a second core a second virtual local area network tag into the packet, wherein the second core is a member of the first plurality of cores; and switch the packet to a second plurality of cores based on the second virtual local area network tag.

Example 42 includes the subject matter of example 37, wherein the instructions stored thereon further comprise instructions that when executed cause the network security appliance to: associate the first plurality of cores with a first virtual local area network identified by the first virtual local area network tag.

Example 43 includes the subject matter of any of examples 37-38 and 41-42, wherein the instructions stored thereon further comprises instructions that when executed cause the network security appliance to: configure a switch of the network appliance to switch packets based on the first virtual local area network tag.

Example 44 is a network security appliance, including: a first core; a first plurality of cores; a switch connected to the first core and the first plurality of cores; a first memory connected to the first core, on which is stored instructions that when executed by a first core of the first core cause the first core to: perform fast path processing of a packet; and send the packet to the switch addressed to a subplurality of the first plurality of cores; and a second memory connected to the first plurality of cores, on which is stored instructions that when executed by the subplurality of the first plurality of cores cause the subplurality of the first plurality of cores to: perform slow path processing of the packet concurrently, wherein the switch is configured to duplicate the packet received from the first core and send the duplicated packet to each of the subplurality of the first plurality of cores.

Example 45 includes the subject matter of example 44, wherein the switch is configured to switch packets based on a virtual local area network standard.

Example 46 includes the subject matter of example 45, wherein the switch switches the packet from the first core to the subplurality of the first plurality of cores based on a virtual local area network tag inserted in the packet by the first core.

Example 47 includes the subject matter of any of examples 44-45, further including: a network interface, connected to the first core, configured to receive the packet.

Example 48 includes the subject matter of example 47, wherein the network interface is connected to the first core via the switch.

Example 49 includes the subject matter of example 48, wherein the switch is configured to insert a first virtual local area network tag into the packet and switch the packet based on the first virtual local area network tag, and wherein the first core is configured as associated with a first virtual local area network identified by the first virtual local area network tag.

Example 50 includes the subject matter of any of examples 44-45, wherein the instructions stored on the second memory comprise instructions that when executed by a second core of the first plurality of cores cause the second core to: send the packet to the switch addressed to a second subplurality of the first plurality of cores.

Example 51 includes the subject matter of example 50, wherein the instructions stored on the second memory further comprise instructions that when executed by the second core cause the second core to: remove a virtual local area network tag added to the packet by the first core; and insert a virtual local area network tag into the packet.

Example 52 includes the subject matter of any of examples 44-45, wherein the switch comprises a buffer memory for holding the packet while switching the packet to the subplurality of the first plurality of cores.

Example 53 is a method of processing packets in a network security appliance, including: receiving a packet at a network interface; performing fast path processing by a first core of the network security appliance; determining by the first core that slow path processing should be performed by a plurality of cores of the network security appliance; sending the packet from the first core to a switch of the network security appliance; duplicating the packet by the switch, sending each of the duplicated packets to a member of the plurality of cores for slow path processing; and performing slow path processing on the duplicated packet.

Example 54 includes the subject matter of example 53, further including: determining by a second core of the plurality of cores performing slow path processing that additional slow path processing should be performed on the packet; sending the packet from the second core to the switch; duplicating the packet by the switch, sending each of the duplicated packets to a member of the plurality of cores performing slow path processing; and performing the additional slow path processing of the packet.

Example 55 includes the subject matter of example 53, further including: inserting a virtual local area network tag into the packet, wherein duplicating the packet by the switch, sending each of the duplicated packets to a member of the plurality of cores for slow path processing comprises: switching the duplicated packets to the plurality of cores based on the virtual local area network tag.

Example 56 includes the subject matter of example 53, further including: associating the first core with a first virtual local area network; and associating the plurality of cores with a second virtual local area network.

Example 57 is a network security appliance including means to perform a method as in any of examples 53-56.

Example 58 is a non-transitory machine readable medium with instructions stored thereon, including instructions that when executed cause a network security appliance to: perform in a first core fast path processing on a packet received by the network security appliance; insert by the first core a first virtual local area network tag into the packet; switch the packet to a first plurality of cores based on the first virtual local area network tag; and perform slow path processing concurrently in the first plurality of cores.

Example 59 includes the subject matter of example 58, wherein the instructions stored thereon further comprise instructions that when executed cause the network security appliance to: receive the packet by a network interface of the network security appliance; insert a second virtual local area network tag into the packet; and switch the packet to the first core based on the second virtual local area network tag.

Example 60 includes the subject matter of example 59, wherein the instructions stored thereon further comprise instructions that when executed cause the network security appliance to: associate the first core with a first virtual local area network identified by the second virtual local area network tag.

Example 61 includes the subject matter of example 59, wherein the instructions stored thereon further comprise instructions that when executed cause the network security appliance to: configure a switch of the network appliance to switch packets based on the first virtual local area network tag and the second virtual local area network tag.

Example 62 includes the subject matter of example 58, wherein the instructions stored thereon further comprise instructions that when executed cause the network security appliance to: remove the first virtual local area network tag from the packet; insert by a second core a second virtual local area network tag into the packet, wherein the second core is a member of the first plurality of cores; and switch the packet to a second plurality of cores based on the second virtual local area network tag.

Example 63 includes the subject matter of example 58, wherein the instructions stored thereon further comprise instructions that when executed cause the network security appliance to: associate the first plurality of cores with a first virtual local area network identified by the first virtual local area network tag.

Example 64 includes the subject matter of example 58, wherein the instructions stored thereon further comprises instructions that when executed cause the network security appliance to: configure a switch of the network appliance to switch packets based on the first virtual local area network tag.

Example 65 is a network security appliance, including: a first core; a first plurality of cores; a switch connected to the first core and the first plurality of cores; a first memory connected to the first core, on which is stored instructions that when executed by a first core of the first core cause the first core to: perform fast path processing of a packet; and send the packet to the switch addressed to a subplurality of the first plurality of cores; and a second memory connected to the first plurality of cores, on which is stored instructions that when executed by the subplurality of the first plurality of cores cause the subplurality of the first plurality of cores to: perform slow path processing of the packet concurrently, wherein the switch is configured to duplicate the packet received from the first core and send the duplicated packet to each of the subplurality of the first plurality of cores.

Example 66 includes the subject matter of example 65, wherein the switch is configured to switch packets based on a virtual local area network standard.

Example 67 includes the subject matter of example 66, wherein the switch switches the packet from the first core to the subplurality of the first plurality of cores based on a virtual local area network tag inserted in the packet by the first core.

Example 68 includes the subject matter of example 65, further including: a network interface, connected to the first core, configured to receive the packet.

Example 69 includes the subject matter of example 68, wherein the network interface is connected to the first core via the switch.

Example 70 includes the subject matter of example 69, wherein the switch is configured to insert a first virtual local area network tag into the packet and switch the packet based on the first virtual local area network tag, and wherein the first core is configured as associated with a first virtual local area network identified by the first virtual local area network tag.

Example 71 includes the subject matter of example 65, wherein the instructions stored on the second memory comprise instructions that when executed by a second core of the first plurality of cores cause the second core to: send the packet to the switch addressed to a second subplurality of the first plurality of cores.

Example 72 includes the subject matter of example 71, wherein the instructions stored on the second memory further comprise instructions that when executed by the second core cause the second core to: remove a virtual local area network tag added to the packet by the first core; and insert a virtual local area network tag into the packet.

Example 73 includes the subject matter of example 65, wherein the switch comprises a buffer memory for holding the packet while switching the packet to the subplurality of the first plurality of cores.

Example 74 is a method of processing packets in a network security appliance, including: receiving a packet at a network interface; performing fast path processing by a first core of the network security appliance; determining by the first core that slow path processing should be performed by a plurality of cores of the network security appliance; sending the packet from the first core to a switch of the network security appliance; duplicating the packet by the switch, sending each of the duplicated packets to a member of the plurality of cores for slow path processing; and performing slow path processing on the duplicated packet.

Example 75 includes the subject matter of example 74, further including: determining by a second core of the plurality of cores performing slow path processing that additional slow path processing should be performed on the packet; sending the packet from the second core to the switch; duplicating the packet by the switch, sending each of the duplicated packets to a member of the plurality of cores performing slow path processing; and performing the additional slow path processing of the packet.

Example 76 includes the subject matter of example 74, further including: inserting a virtual local area network tag into the packet, wherein duplicating the packet by the switch, sending each of the duplicated packets to a member of the plurality of cores for slow path processing comprises: switching the duplicated packets to the plurality of cores based on the virtual local area network tag.

Example 77 includes the subject matter of example 74, further including: associating the first core with a first virtual local area network; and associating the plurality of cores with a second virtual local area network.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory machine readable medium with instructions stored thereon, comprising instructions that when executed cause a network security appliance to:
perform in a first core fast path processing on a packet received by the network security appliance;
insert by the first core a first virtual local area network tag into the packet;
define a first virtual local area network to a switch of the network security appliance, the first virtual local area network associated with the first virtual local area network tag;
assign a first plurality of cores to the first virtual local area network associated with the first virtual local area network tag;
switch the packet from the first core to the first plurality of cores via the switch based on the first virtual local area network tag;
perform slow path processing concurrently in the first plurality of cores;
remove the first virtual local area network tag from the packet;
insert by a second core a second virtual local area network tag into the packet, wherein the second core is a member of the first plurality of cores; and
send the packet from the second core to a second plurality of cores via the switch based on the second virtual local area network tag.

2. The non-transitory machine readable medium of claim 1, wherein the instructions stored thereon further comprise instructions that when executed cause the network security appliance to:
receive the packet by a network interface of the network security appliance;
define a second virtual local area network to the switch, the second virtual local area network associated with a second virtual local area network tag;
insert the second virtual local area network tag into the packet; and
switch the packet from the network interface to the first core via the switch based on the second virtual local area network tag.

3. The non-transitory machine readable medium of claim 2, wherein the instructions stored thereon further comprise instructions that when executed cause the network security appliance to:
configure a switch of the network appliance to switch packets based on the first virtual local area network tag and the second virtual local area network tag.

4. The non-transitory machine readable medium of claim 1, wherein the instructions stored thereon further comprises instructions that when executed cause the network security appliance to:
configure a switch of the network appliance to switch packets based on the first virtual local area network tag.

5. A network security appliance, comprising:
a first core;
a first plurality of cores;
a switch connected to the first core and the first plurality of cores;
a first memory connected to the first core, on which is stored instructions that when executed by the first core cause the first core to:
perform fast path processing of a packet; and
insert a first virtual local area network tag into the packet, the first virtual local area network tag identifying a first virtual local area network associated with a subplurality of the first plurality of cores;
send the packet to the switch for duplication and delivery to the first subplurality of cores; and
a second memory connected to the first plurality of cores, on which is stored instructions that when executed by the subplurality of the first plurality of cores cause the subplurality of the first plurality of cores to:
perform slow path processing of the packet concurrently;
send the packet to the switch addressed to a second subplurality of the first plurality of cores;
remove a virtual local area network tag added to the packet by the first core; and
insert a virtual local area network tag into the packet,
wherein the switch is configured to duplicate the packet received from the first core and send the duplicated packet to each of the subplurality of the first plurality of cores.

6. The network security appliance of claim 5, wherein the switch is configured to switch packets based on a Q-in-Q virtual local area network standard.

7. The network security appliance of claim 5, further comprising:
a network interface, connected to the first core, configured to receive the packet.

8. The network security appliance of claim 7, wherein the network interface is connected to the first core via the switch.

9. The network security appliance of claim 8,
wherein the switch is configured to insert a first virtual local area network tag into the packet and switch the packet based on the first virtual local area network tag, and
wherein the first core is configured as associated with a first virtual local area network identified by the first virtual local area network tag.

10. The network security appliance of claim 5, wherein the switch comprises a buffer memory for holding the packet while switching the packet to the subplurality of the first plurality of cores.

11. A method of processing packets in a network security appliance, comprising:
receiving a packet at a network interface;
switching the packet to a first core of the network security appliance;
performing fast path processing by the first core of the network security appliance;
determining by the first core that slow path processing should be performed by a plurality of cores of the network security appliance;
inserting by the first core a first virtual local area network tag into the packet;
sending the packet from the first core to a switch of the network security appliance;

duplicating the packet by the switch, sending each of the duplicated packets to a member of the plurality of cores for slow path processing based on the first virtual local area network tag;

performing slow path processing on the duplicated packet by the plurality of cores;

determining by a second core of the plurality of cores performing slow path processing that additional slow path processing should be performed on the packet;

inserting a second virtual local area network tag into the packet;

sending the packet from the second core to the switch;

duplicating the packet by the switch, sending the duplicated packets to a subplurality of the plurality of cores performing slow path processing based on the second virtual local area network tag; and performing the additional slow path processing of the packet by the subplurality of the plurality of cores.

12. The method of claim 11, further comprising:

associating the first core with a first virtual local area network; and associating the plurality of cores with a second virtual local area network.

\* \* \* \* \*